US011599462B1

(12) United States Patent
Hawkins (10) Patent No.: US 11,599,462 B1
(45) Date of Patent: Mar. 7, 2023

(54) MEMORY CACHE ENTRY MANAGEMENT WITH PINNED CACHE ENTRIES

(71) Applicant: Google LLC, Mountain View, CA (US)

(72) Inventor: Amalia Hawkins, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/518,467

(22) Filed: Nov. 3, 2021

(51) Int. Cl.
  *G06F 12/08* (2016.01)
  *G06F 12/0802* (2016.01)

(52) U.S. Cl.
  CPC ...... *G06F 12/0802* (2013.01); *G06F 2212/60* (2013.01)

(58) Field of Classification Search
  CPC .................. G06F 12/0802; G06F 2212/60
  See application file for complete search history.

(56) References Cited

U.S. PATENT DOCUMENTS

| 6,996,676 | B2 | 2/2006 | Megiddo et al. | |
|---|---|---|---|---|
| 2013/0275669 | A1* | 10/2013 | Naga .................. | G06F 3/0665 711/E12.019 |
| 2014/0019677 | A1* | 1/2014 | Chang ................ | G06F 12/0804 711/143 |

OTHER PUBLICATIONS

Source Code File Content, Java.net, https://archive.vn/20130703061815/http://java.net/projects/solaris/sources/on-src/content/usr/src/uts/common/fs/zfs/arc.c?rev=13149, Jul. 3, 2013, 91 pages.

Sorav Bansal et al., "CAR: Clock with Adaptive Replacement", Usenix Association, Proceedings of the Third USENIX Conference on File and Storage Technologies, Jun. 2004, 15 pages.

\* cited by examiner

*Primary Examiner* — Jae U Yu
(74) *Attorney, Agent, or Firm* — Lowenstein Sandler LLP (57) ABSTRACT

Methods and systems for memory cache entry replacement with pinned cache entries. Data structures are maintained for tracking a state of entries of a memory cache. A first data structure includes identifiers for pinned entries of a memory cache. A second data structure includes identifiers for unpinned entries of the memory cache that have been accessed once. A third data structure includes identifiers for unpinned entries of the memory cache that have been accessed more than once. A request to pin an entry is received. A determination is made that an identifier associated with the entry to pin is included in the second data structure or the third data structure. The identifier associated with the pinned entry is added to the first data structure. A detection is made at a time period that one or more entries of the memory cache are to be removed from the memory cache in accordance with an eviction protocol. Identifiers of one or more unpinned entries with state data that satisfies an eviction criterion associated with the eviction protocol are selected from the second data structure and/or the third data structure. The one or more unpinned entries are removed from the memory cache while the pinned entry with corresponding state data is maintained in the memory cache.

20 Claims, 6 Drawing Sheets

```
┌─────────────────┐                          ┌─────────────────┐
│    FREQUENCY    │                          │    FREQUENCY    │
│   GHOST DATA    │                          │   GHOST DATA    │
│  STRUCTURE 266  │                          │  STRUCTURE 266  │
└─────────────────┘                          └─────────────────┘

┌─────────────┐ ┌──────┐ ┌──────┐    ┌─────────────┐ ┌──────┐ ┌──────┐ ┌──────┐
│  UNPINNED   │ │ENTRY │ │ENTRY │    │  UNPINNED   │ │ENTRY │ │ENTRY │ │ENTRY │
│FREQUENCY DATA│ │ 302C │ │ 302D │    │FREQUENCY DATA│ │ 302B │ │ 302C │ │ 302D │
│STRUCTURE 262│ │      │ │      │    │STRUCTURE 262│ │      │ │      │ │      │
└─────────────┘ └──────┘ └──────┘    └─────────────┘ └──────┘ └──────┘ └──────┘

┌─────────────┐                       ┌─────────────┐
│   PINNED    │                       │   PINNED    │
│FREQUENCY DATA│                       │FREQUENCY DATA│
│STRUCTURE 270│                       │STRUCTURE 270│
└─────────────┘                       └─────────────┘

┌─────────────┐                       ┌─────────────┐ ┌──────┐
│PINNED RECENCY│                      │PINNED RECENCY│ │ENTRY │
│DATA STRUCTURE│                      │DATA STRUCTURE│ │ 302A │
│     268     │                       │     268     │ │      │
└─────────────┘                       └─────────────┘ └──────┘

┌─────────────┐ ┌──────┐ ┌──────┐    ┌─────────────┐ ┌──────┐ ┌──────┐
│  UNPINNED   │ │ENTRY │ │ENTRY │    │  UNPINNED   │ │ENTRY │ │ENTRY │
│RECENCY DATA │ │ 302B │ │ 302A │    │RECENCY DATA │ │ 302E │ │ 302F │
│STRUCTURE 260│ │      │ │      │    │STRUCTURE 260│ │      │ │      │
└─────────────┘ └──────┘ └──────┘    └─────────────┘ └──────┘ └──────┘

┌─────────────┐                       ┌─────────────┐
│RECENCY GHOST│                       │RECENCY GHOST│
│DATA STRUCTURE│                      │DATA STRUCTURE│
│     264     │                       │     264     │
└─────────────┘                       └─────────────┘
```

MEMORY CACHE ENTRY MANAGEMENT WITH PINNED CACHE ENTRIES

TECHNICAL FIELD

Aspects and implementations of the present disclosure relate to a memory cache entry management with pinned cache entries.

BACKGROUND

A memory cache (simply referred to as a cache herein) may enable faster data retrieval than memory storage (i.e., residing on devices such as solid-state drives, flash memory devices, etc.) for the computing system. As the amount of space of a cache can be smaller than the amount of storage space, the computing system can implement memory management techniques to ensure that frequently and/or recently accessed data remains in the cache and infrequently and/or not recently accessed data is evicted from the cache. For example, a computing system can execute a data replacement protocol (e.g., a page replacement protocol, a chunk replacement protocol, etc.), to select an entry (e.g., a page) to remove from the cache (e.g., when the cache is full, etc.). In some systems, an entry that is the least recently accessed and/or the least frequently accessed is selected for removal. One or more entries can be pinned in the cache (e.g., by an application running on the computing system, by a user of the computing system, etc.). A pinned entry refers to a cache entry that is designated to remain in the cache even if the entry is a qualified candidate for eviction according to a data replacement algorithm.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, method and system are disclosed for memory cache replacement with pinned cache entries. In an implementation, the method includes maintaining data structures configured to track a state of entries of a memory cache. A first data structure includes identifiers for pinned entries of a memory cache. A second data structure includes identifiers for unpinned entries of the memory cache that have been accessed once. A third data structure includes identifiers for unpinned entries of the memory cache that have been accessed more than once. The method further includes receiving a request to pin an entry. The method further includes determining that an identifier associated with the entry to pin is included in the second data structure or the third data structure. The method further includes adding the identifier associated with the pinned entry to the first data structure. The method further includes detecting, at a time period, that one or more entries of the memory cache are to be removed from the memory cache in accordance with an eviction protocol. The method further includes selecting, from unpinned entries of at least one of the second data structure or the third data structure, one or more unpinned entries with state data that satisfies an eviction criterion associated with the eviction protocol, wherein the state data of the one or more unpinned entries corresponds to state data of the pinned entry. The method further includes removing the one or more unpinned entries from the memory cache while maintaining the pinned entry in the memory cache.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects of the present disclosure relate to methods and systems for memory cache entry management with pinned cache entries. In some computing systems, data can be stored at a portion of system memory that enables long term storage of the data (referred to herein as data storage space or simply storage space). Retrieving data from storage space (e.g., in response to a request from an application running on the computing system, from an operating system of the computing system, etc.) can take a significant amount of time, due to the type of memory devices that enable long term data storage (e.g., solid-state devices, flash memory devices, etc.). Accordingly, computing systems can copy some data from storage space to a memory cache. A memory cache refers to a portion of memory of a computing system that is configured to temporarily store frequently and/or recently accessed data. A memory cache (simply referred to as a cache herein) typically resides on memory devices (e.g., random access memory devices, etc.) that enable faster data retrieval than storage devices. As the amount of cache space of a computing system can be smaller than the amount of storage space of the computing system, the computing system can implement memory management techniques to ensure that frequently accessed and/or recently accessed data remains in the cache and infrequently accessed and/or not recently accessed data is removed (also referred to herein as evicted) from the cache. For example, the computing system can execute a cache eviction protocol to select an entry (e.g., a page, a chunk, etc.) of a cache that is to be removed from the cache (e.g., when the cache is full, etc.).

Some computing systems maintain one or more data structures to track a state of each entry of the cache. A state of a cache entry can correspond to a time period the entry was last accessed, whether the entry has been accessed once or more than once, etc. Such data structures can be used for selecting an entry for eviction (e.g., in accordance with the cache eviction protocol). For example, a computing system can maintain a data structure (e.g., a list, a circular buffer, etc.) that includes identifiers for cache entries that have been accessed once (e.g., by an application running on the computing system, by an operating system running on the computing system, etc.) and an additional data structure that includes identifiers for cache entries that have been accessed more than once. In some instances, each identifier can be added to the respective data structure based on an order at which the corresponding cache entry was last accessed. For example, if the data structures correspond to a list-type data structure, identifiers for entries of a respective list that are most recently accessed can be included at a top of the list, while identifiers for entries that are least recently accessed can be included at a bottom of the list. As data is copied from storage space to the cache (e.g., by the application, by the operating system, etc.), identifiers for entries including the copied data are added to the top of a respective list, and identifiers for existing entries of the list are pushed toward the bottom of the list. As existing entries of the list are accessed, identifiers for such entries are moved from the current slot or position of the list to the top of the list, or to the top of another list maintained by the computing system (e.g., from a recently accessed list to a frequently accessed list, etc.). Computing systems can select cache entry for removal based on such data structures. For example, in response to detecting that one or more cache entries are to be removed from the cache (e.g., when the cache is full, etc.), computing systems can identify entries having identifiers that are at the bottom of the respective lists and select the identified entries for eviction.

Most conventional cache eviction protocols do not support pinning entries to a memory cache. Pinning an entry to a cache refers to designating data of a cache entry to remain in the cache even if the entry is a qualified candidate for eviction according to a cache eviction protocol. For example, a pinned entry would not be evicted from the cache even if the pinned entry is the least recently accessed and/or least frequently accessed entry of the cache. By pinning an entry to a cache, the data of the entry remains in the cache so that when the entry is referenced, the data is readily available to be read from and/or modified in the cache without the computing system having to consume system resources to retrieve the data from memory storage.

Some cache eviction protocols provide a mechanism to keep certain cache entries in the cache, even if the entries would be otherwise eligible for eviction. For example, some cache eviction protocols track a number of instances that each cache entry is accessed and select an entry for pinning once the tracked number meets a pinning criterion (e.g., meets a threshold number of instances). However, such cache eviction protocols generally do not enable an application, an operating system, a user, etc. to request an entry to be pinned (e.g., for any reason). Additionally, such cache eviction protocols typically consume a significant amount of memory or processing resource overhead to track the number of instances that each entry of the cache is referenced. Such cache eviction protocols usually also maintain identifiers for pinned entries in existing data structures (e.g., a data structure for tracking entries that have been accessed once, a data structure for tracking entries that have been accessed more than once, etc.). Accordingly, each time that entries are selected for removal (e.g., in accordance with the cache eviction protocol), the state data for the pinned entries are considered for determination of whether to remove such entries, even though such entries are pinned to the cache.

The amount of system resources that are consumed to track the number of instances each respective cache entry is accessed and determine whether a respective entry qualifies for pinning can counteract any reduction in resource consumption obtained by pinning the entry to the cache. A further amount of system resources can be consumed in considering whether a pinned entry is eligible for eviction, even though such entries are designated to remain in the cache. Additionally, as significant computing resources are consumed by such cache eviction protocols, fewer resources are available for other processes of the computing system, which increases overall system latency and decreases overall system efficiency.

Implementations of the present disclosure address the above and other deficiencies by providing methods and systems for enabling flexible (e.g., not limited by a rigid rule) entry pinning for a memory cache eviction protocol. A caching engine (e.g., running on a computing system) can maintain data structures (e.g., lists, circular buffers, etc.) for tracking a state of entries of a memory cache. A first data structure can include identifiers for pinned entries of the memory cache, a second data structure can include identifiers for unpinned entries of the memory cache that have been accessed once, and a third data structure can include identifiers for unpinned entries of the memory cache that have been accessed more than once. In some embodiments, the identifiers for a cache entry can be added to a respective data structure in view of a time period that the entry was last accessed (e.g., by an application running on the computing system, by an operating system of the computing system, etc.). For example, if the data structures correspond to a list-type data structure, identifiers for most recently accessed entries can be added and/or moved to a top portion of the respective list. Identifiers for existing entries of the list can be pushed towards a bottom portion of the list as identifiers are added and/or moved to the top of the list. Entries having identifiers towards the bottom of a respective list can correspond to the least recently accessed entries that are tracked using the respective list.

In some embodiments, the caching engine can receive a request to pin an entry to the cache. In some embodiments, the request can be received from an application running on the computing system, an operating system running on the computing system, a user of the computing system, etc. In one example, the caching engine can receive the request responsive to the operating system (or another component of the computing system) designating a particular cache entry to be pinned to the cache if data of the entry has been modified (e.g., by an application running on the computing system) and the modified data has not yet been updated at the storage device. In another example, the caching engine can receive the request responsive to the operating system (or another component of the computing system) designating a particular cache entry to be pinned in response to detecting that a file associated with the entry is an important file that is going to be used at a later time period (e.g., based on an indication received from an application running on the computing system or a user of the computing system). In yet another example, the caching engine may receive the request responsive to a user of the computing system requesting (e.g., via a client device) that particular data (e.g., corresponding to a file or a portion of a file) residing in the cache be pinned.

In some embodiments, responsive to receiving the request, the caching engine can determine that an identifier associated with the entry is included in the second data structure or the third data structure. In such embodiments, the caching engine can move the identifier from the second data structure of the third data structure to the first data structure. In other or similar embodiments, the data to be pinned may not reside in the cache at the time that the pinning request is received. In such embodiments, the caching engine may retrieve the data from storage space and copy the retrieved data to an entry of the cache. The caching engine can add an identifier for the entry to the first data structure, as described above. It should be noted that in some embodiments, of the present disclosure, the caching engine can maintain multiple data structures to track the state of pinned entries. For example, the first data structure can be used for tracking pinned entries that have been accessed once (e.g., by an application, by the operating system, etc.). The caching engine can maintain a fourth data structure that is used for tracking pinned entries that have been accessed more than once. The caching engine can add and/or move the identifier for the pinned entry to the first data structure or the fourth data structure, as described above.

The caching engine can detect, at a time period, that one or more entries are to be removed from the cache in accordance with a cache eviction protocol. For example, the caching engine can detect that one or more entries are to be removed from the cache in response to determining that there is no and/or limited available space in the cache for new entries to be added to the cache. The caching engine can select one or more unpinned entries from the second data structure and/or the third data structure having state data that satisfies an eviction criterion associated with the eviction protocol. For example, the caching engine can select an unpinned entry that is the least recently accessed entry and/or least frequently accessed entry indicated by the second data structure and/or the third data structure for eviction. In some embodiments, state data for the selected one or more unpinned entries can correspond to (e.g., be the same as) state data of one or more pinned entries (e.g., indicated by the first data structure and/or the fourth data structure). In response to selecting the one or more unpinned entries for eviction, the caching engine can remove the one or more unpinned entries from the memory cache while maintaining the pinned entries with similar state data in the memory cache.

In some embodiments, the caching engine can receive a request to unpin one or more pinned entries in the cache. The caching engine can move an identifier for the one or more pinned entries from the first data structure (and/or the fourth data structure) to the second data structure and/or the third data structure, in some embodiments. In some embodiments, the caching engine can move the identifier to a position in the second data structure and/or the third data structure that corresponds to a time at which the entry was last accessed. For example, if a pinned entry is the least recently accessed entry in the memory cache, the caching engine can move the identifier for the entry to the bottom of the second data structure and/or the third data structure, as described above. Such entry may be eligible for eviction after the identifier is moved to the second data structure and/or the third data structure, in accordance with previously described embodiments.

Aspects of the present disclosure provide a mechanism for a memory management protocol that enables flexible cache entry pinning. As described above, embodiments of the present disclosure enable an application running on a computing system, an operating system of a computing system, a user of the computing system, etc. to designate cache entries and/or data (e.g., of a file) to be pinned to the cache. Further, embodiments of the present disclosure enable the application, the operating system, the user, etc. to designate an entry for pinning for any reason. Accordingly, the embodiments of the present disclosure do not consume computing resources (e.g., memory space, processing cycles, etc.) tracking a number of instances that a respective entry is referenced to determine whether the entry is eligible for pinning. Embodiments of the present disclosure further maintain one or more data structures for tracking pinned entries for the memory cache, rather than tracking the pinned entries in the same data structures that are used for tracking unpinned entries. Accordingly, embodiments of the present disclosure do not consider the state data for pinned entries for eviction in each instance that the cache eviction protocol is invoked to evict one or more cache entries, which makes a significant amount of computing resources (e.g., processing cycles, etc.) available for other processes. As more resources are available for other processes, an overall latency for the computing system is decreased and an overall efficiency for the computing system is increased.

Figure 1:
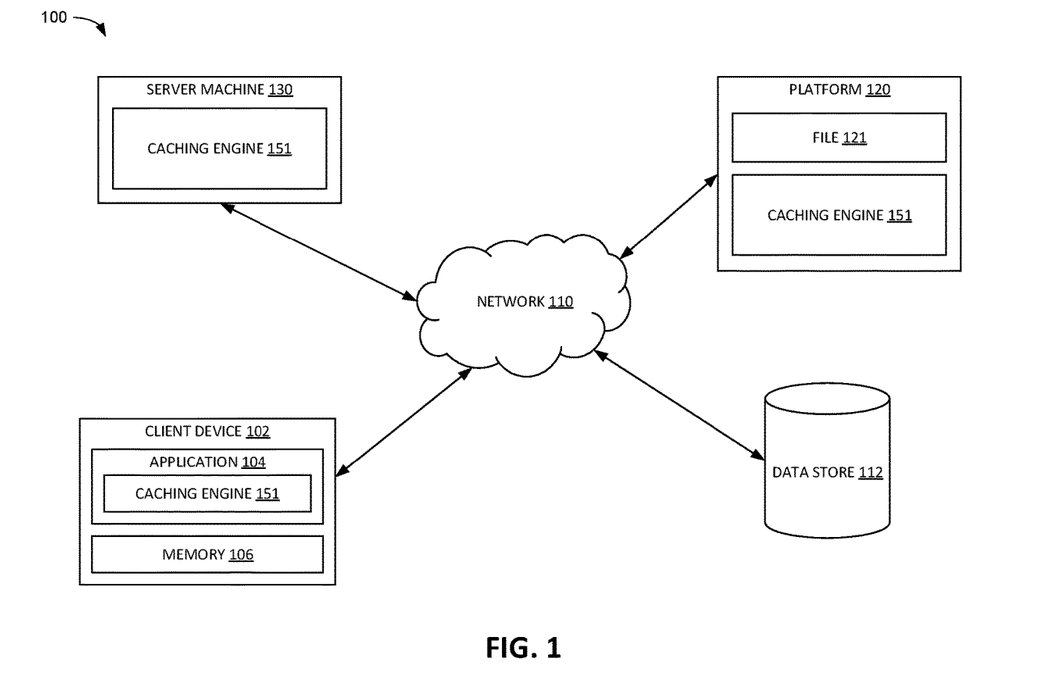
FIG. 1 illustrates an example system architecture, in accordance with implementations of the present disclosure.

FIG. 1 illustrates an example system architecture 100, in accordance with implementations of the present disclosure. The system architecture 100 (also referred to as "system" herein) includes one or more client devices 102, a data store 112, a platform 120 (e.g., a document sharing platform), and one or more server machines 130, each connected to a network 110. In some embodiments, one or more components of system 100 can be included as part of a network-based storage system.

In implementations, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 112 is a persistent storage that is capable of storing data as well as data structures to tag, organize, and index the data. A data item can include audio data and/or video data, in accordance with embodiments described herein. Data store 112 can be hosted by one or more storage devices, such as main memory, magnetic or optical storage based disks, tapes or hard drives, NAS, SAN, and so forth. In some implementations, data store 112 can be a network-attached file server, while in other embodiments data store 112 can be some other type of persistent storage such as an object-oriented database, a relational database, and so forth, that may be hosted by platform 120 or one or more different machines (e.g., server machine 130, etc.) coupled to the platform 120 via network 110.

Client device 102 can include one or more computing devices such as personal computers (PCs), laptops, mobile phones, smart phones, tablet computers, netbook computers, network-connected televisions, etc. In some implementations, client device 102 can also be referred to as a "user device." In some implementations, platform 120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 and/or provide the file 121 to the user. File 121 may refer to an electronic document file (e.g., a text file, a slide presentation file, a spreadsheet file, etc.), an electronic message file (e.g., an e-mail file), an image file, a video file, a multi-media file, and so forth. In some embodiments, platform 120 may provide client device 102 with one or more document applications 104. In some implementations, a document application 104 can be an application that provides a user interface (UI) for users to view, create, or edit content of file 121. For example, the document application 104 may be a web browser that can access, retrieve, present, and/or navigate files 121 served by a web server. The document application 104 may render, display, and/or present the content of a file 121 to a user. In one example, the document application 104 may be a standalone application (e.g., a mobile application or app) that allows users to view, edit, and/or create digital content items (e.g., electronic documents, electronic messages, digital video items, digital images, electronic books, etc.). In some implementations, the document application 104 may be an electronic document platform application for users to generate, edit, and/or upload content for electronic documents on the platform 120. In other or similar implementations, the document application 104 may be an electronic messaging platform application (e.g., an electronic mail (e-mail) application) for users to generate and send messages via platform 120.

In some embodiments, platform 120 may provide a user with access to file 121 by obtaining the file 121 from data store 112 and transmitting each portion of the file 121 via network 110 to client device 102. Client device 102 may store file 121 at memory 106 of client device 102 and application 104 running on client device 102 may provide the user with access to the file 121 via a UI of client device 102. In other or similar embodiments, application 104 can be (or can be connected to platform 120) via a web browser. In such embodiments, the user can access file 121 via application 104 without platform 120 transmitting each portion of file 121 to client device 102 for storage in memory 106. Instead, platform 120 can transmit one or more portions of file 121 to client device 102, as user accesses, or is expected to access, the one or more portions, in some embodiments. In at least some of the previously described embodiments, portions of file 121 can be stored (e.g., at data store 112, at memory 106, etc.) as one or more data units, such as a memory page, a memory chunk, a memory block, etc. In some embodiments, a single file 121 can be stored as multiple data units (i.e., in view of a memory management protocol associated with platform 120, client device 102, etc.). In other or similar embodiments, a single file 121 can be stored as a single data unit (i.e., a single file 121 can be stored as a single memory page, a single memory chunk, etc.).

In some embodiments, data store 112 and/or memory 106 can include a memory cache and/or data storage space. A memory cache (referred to herein as a cache) refers to a portion of memory of a computing system that is configured to temporarily store frequently accessed data. Data storage space (referred to herein as data storage or simply storage) refers to a portion of memory that is configured to store data for a long period of time (e.g., if power to the memory is lost, etc.). A cache can reside on one or more memory devices (e.g., random access memory devices, etc.) that enable faster data retrieval than devices configured for data storage (e.g., solid-state drives, flash memory drives, etc.). In some embodiments, an amount of space of data store 112 and/or memory 106 that is reserved for caching can be smaller than the amount of storage space available to store data. In an illustrative example, one or more data units associated with file 121 can be stored in data storage space of data store 112 and/or memory 106. When application 104 (and/or another component of client device 102) references a portion of file 121, one or more data units associated with the accessed portion of file 121 can be identified at the data storage space of data store 112 and/or memory 106 and copied to the memory cache associated with data store 112 and/or memory 106 (referred to herein as a cache entry or simply an entry). Application 104 (and/or the other component of client device 102) can access the data units associated with the accessed portion of file 121 via the memory cache, in some embodiments.

As indicated above, the amount cache space can be smaller than the amount storage of data store 112 and/or memory 106. In some embodiments, caching engine 151 can implement a cache eviction protocol to manage which data units residing in data storage space can be copied to the memory cache and which data units are to be removed (also referred to as evicted) from the memory cache to make room for other data units. The cache eviction protocol, in some embodiments, can favor entries that are frequently and/or recently accessed to remain in the cache, and provide entries that are infrequency and/or not recently accessed for eviction from the cache. However, the cache eviction protocol can provide that entries are to be evicted from the memory cache according to other cache characteristics. For example, the cache eviction protocol can correspond to a least recently modified eviction protocol, a first in first out eviction protocol, a last in first out eviction protocol, a first in last out eviction protocol, and so forth.

In some embodiments, caching engine 151 can maintain one or more data structures to track a state of each cache entry of the memory cache. An entry state can correspond to a time period at which the entry was last accessed and/or modified by application 104 (i.e., a recency of the entry reference), a number of instances that the entry has been accessed by application 104 (i.e., a frequency of the entry reference), and so forth. In one example, caching engine 151 can maintain multiple data structures to track a recency and/or frequency at which data units residing at the cache are accessed by application 104. Caching engine 151 can select one or more entries to remove from the cache (e.g., if an amount of available space of the cache falls below a threshold amount, etc.) by identifying entries of the memory cache having state (i.e., as indicated by the one or more data structures) that satisfies one or more eviction criteria associated with the cache eviction protocol. In accordance with the previously example, caching engine 151 can use the multiple data structures to identify one or more entries that are the least recently accessed and/or the least frequently accessed entries for eviction, in accordance with a least recently accessed and/or least frequently accessed cache eviction protocol.

In some embodiments, caching engine 151 can detect that one or more cache entries are pinned to the cache. As indicated above, a pinned entry refers to a cache entry that is designated to remain in the cache even if the entry is a qualified candidate for eviction (e.g., the entry is the least recently and/or least frequently accessed entry of the cache). For example, a state associated with a respective entry can indicate that the entry is the least recently accessed and/or least frequently accessed cache entry of the memory cache. However, if the respective entry is a pinned entry, caching engine 151 can identify another entry (e.g., the second least recently accessed and/or second least frequently accessed entry) for eviction instead of the pinned entry. Caching engine 151 can maintain one or more additional data structures that track one or more pinned entries of the cache and a state of the pinned entries. Caching engine 151 can pin an entry to the cache by adding an identifier associated with the entry to the one or more additional data structures. Once an entry is pinned to the cache, caching engine 151 does not evict the pinned entry from the cache, even if the entry would otherwise qualify for eviction in accordance with the cache eviction protocol. Further details regarding cache eviction protocols and pinned entries are provided herein.

In some implementations, platform 120 and/or server machine 130 can operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. In some implementations, the functions of platform 120 and/or server machine 130 may be provided by a more than one machine. For example, in some implementations, the functions of caching engine 151 may be provided by two or more separate machines. Platform 120 and/or server machine 130 may also include a website (e.g., a webpage) or application back-end software that may be used to enable a user to access and/or share electronic documents.

In general, functions described in implementations as being performed by platform 120 can also be performed on the client device 102 in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in web sites.

It should be noted that although some embodiments of the present disclosure are directed to a document sharing platform, embodiments of this disclosure can be applied to other types of platforms. For example, embodiments of the present disclosure can be applied to a document archive platform, a document storage platform, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the platform 120.

In situations in which the systems discussed here collect personal information about users, or can make use of personal information, the users can be provided with an opportunity to control whether platform 120 collects user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 120.

Figure 2:
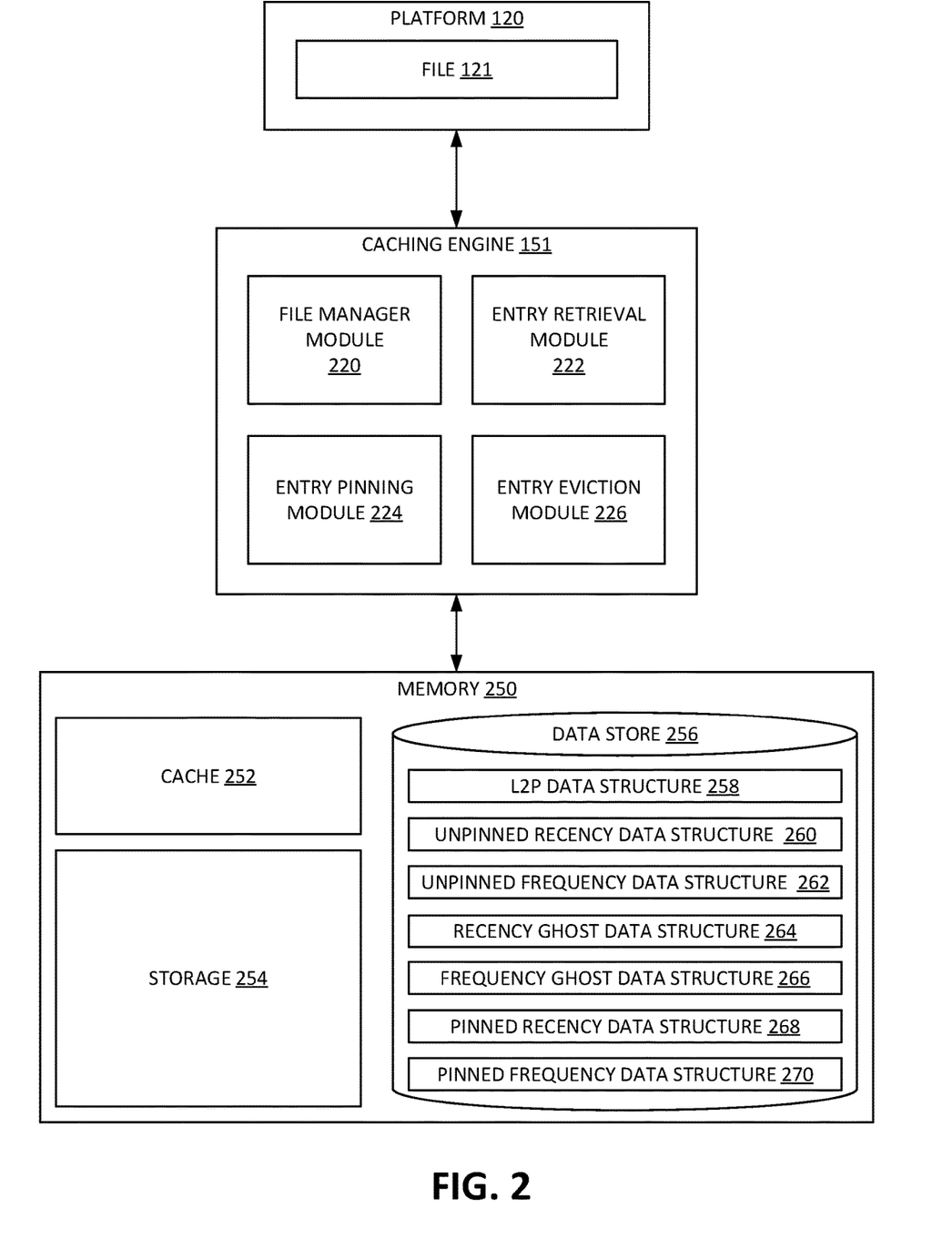
FIG. 2 is a block diagram illustrating a platform and a caching engine for the platform, in accordance with implementations of the present disclosure.

FIG. 2 is a block diagram illustrating a platform 120 and a caching engine 151 for the platform, in accordance with implementations of the present disclosure. Caching engine 151 can manage one or more entries of a memory cache (e.g., cache 252 of memory 250) that store one or more data units (e.g., memory pages, memory chunks, etc.) of file 121. As illustrated in FIG. 2, caching engine 151 (and/or platform 120) can be connected to a memory 250. In some embodiments, caching engine 151 can execute on a processing device associated with client device 102. In such embodiments, one or more portions of memory 250 can correspond to memory 106, described with respect to FIG. 1. In other or similar embodiments, caching engine 151 can execute on one or more processing devices associated with platform 120. In such embodiments, one or more portions of memory 250 can correspond to data store 112. Caching engine 151 can include a file manager module 220, an entry retrieval module 222, an entry pinning module 224, and/or an entry eviction module 226, as illustrated in FIG. 2.

As described with respect to FIG. 1, platform 120 can provide one or more portions of file 121 to client device 102, to be provided to a user (e.g., via a user interface of client device 102). In some embodiments, platform 120 may transmit one or more data units (e.g., memory pages, memory chunks, etc.) associated with the portions of file 121 to client device 102 via network 110. File manager module 220 of caching engine 151 can store the one or more data units at a portion of memory 250 reserved for long term data storage (e.g., storage space 254). In some embodiments, file manager module 220 can copy the stored data units of file 121 to available entries of cache 252. In other or similar embodiments, entry retrieval module 222 of caching engine 151 can retrieve and copy the stored data units to cache 252 in response to receiving a request (e.g., from application 104) to access the particular portion of file 121 associated with the data units, as described below.

In some embodiments, each stored data unit of file 121 can be associated with a logical address (e.g., provided by platform 120, application 104, etc.). However, the logical address for a respective data unit may not correspond to a physical address of memory 250 that stores the data unit. In some embodiments, file manager module 220 can generate a mapping between the logical address associated with the data unit and the physical address of memory 250 that stores the data unit and store the generated mapping at a logical to physical (L2P) translation data structure 258. In some embodiments, the L2P translation data structure 258 (also referred to as L2P data structure 258 herein) can reside at data store 256. Data store 256 can correspond to a database or other data structure of memory 250 that stores data structures maintained by caching engine 151 or other components of client device 102 and/or platform 120.

As indicated above, entry retrieval module 222 can retrieve one or more data units from storage 254 and copy the retrieved data units to available cache entries of cache 252 (e.g., in response to a request from application 104, etc.). For example, entry retrieval module 222 can receive a request from application 104 to access a particular portion of file 121. The request can include a logical address for data units associated with the particular portion. Entry retrieval module 222 can identify a portion of storage 254 that stores the data units using L2P data structure 258 and can copy the data units to an available entry of cache 252. In some embodiments, entry retrieval module 222 can update a mapping associated with the data units in L2P data structure 258 to indicate a mapping between the entry of cache 252 that stores the data units and the logical address associated with the data units.

In some embodiments, entry retrieval module 222 can add an identifier associated with the entry that stores the copied data units to one or more data structures of data store 256. For example, if application 104 has requested access to data units associated with the entry (also referred to herein as referencing the cache entry) only once and the entry is not a pinned entry, entry retrieval module 222 can add the identifier associated with the entry to unpinned recency data structure 260. If application 104 has accessed the entry more than once and the entry is not pinned, entry retrieval module 222 can add the entry identifier to unpinned frequency data structure 262. If the entry is pinned and has been accessed only once, entry retrieval module 222 (and/or entry pinning module 224) can add the entry identifier to pinned recency data structure 268, as described in further detail herein. If the entry is pinned and has been accessed more than once, entry retrieval module 222 (and/or entry pinning module 224) can add the entry identifier to pinned frequency data structure 270, as described in further detail herein.

FIGS. 3A-3D illustrate an example of managing cache entries 302 of a cache 252 and using data structures to select entries 302 for eviction according to a cache eviction protocol. It should be noted that some embodiments of FIGS. 3A-3D are provided for the purpose of illustration only and other types of data structures can be used. It should also be noted that identifiers for entries 302 of the below described embodiments can be added to other or different data structures in another or different order than provided herein.

Figure 3A:
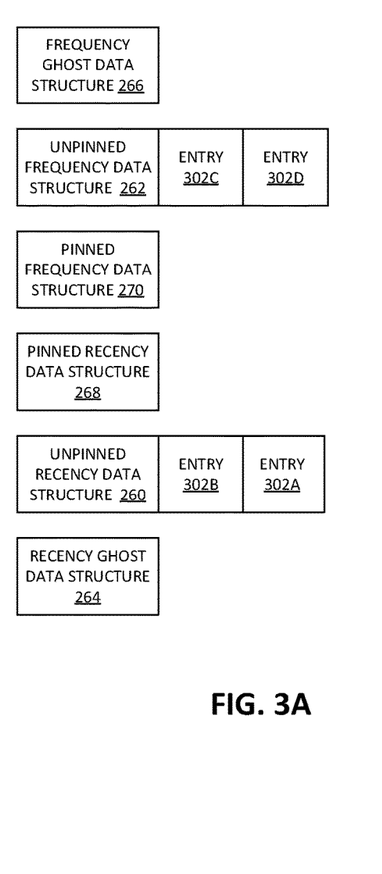
FIGS. 3A-3D illustrate an example memory cache replacement scheme with pinned cache entries, in accordance with implementations of the present disclosure.

As described with respect to FIG. 2, entry retrieval module 222 can add an identifier for an entry of cache 252 to unpinned recency data structure 260 (e.g., if the entry is not pinned and has been accessed by application 104 only once). As illustrated in FIG. 3A, in response to determining that entry 302A is not pinned and has been accessed by application 104 once, entry retrieval module 222 can add an identifier for entry 302A to data structure 260. In some embodiments, entry retrieval module 222 can add the identifier for entry 302A to a portion of data structure 260 that indicates that entry 302A is the most recently accessed entry of the other entries identified by data structure 260. For example, data structure 260 can correspond to a list (or other similar type of data structure), where identifiers indicated at a top of the list correspond to cache entries that have been more recently accessed than entries indicated towards a bottom of the list. Accordingly, entry retrieval module 222 can add the identifier for entry 302A to the top of data structure 260. In an illustrative example, entry retrieval module 222 can copy data units of file 121 to entry 302B, in accordance with previously described embodiments. In response to determining that entry 302B is not pinned and has been accessed by application 104 once, entry retrieval module 222 can add an identifier for entry 302B to data structure 260. Entry retrieval module 222 can add the identifier for entry 302B to the top of data structure 260, to indicate that entry 302B is the most recently accessed entry of cache 252, as described above. In such example, the identifier for entry 302A is moved down the list (e.g., towards the bottom of the list) of data structure 260, as entry 302A is no longer the most recently accessed entry of cache 252.

As described with respect to FIG. 2, entry retrieval module 222 can add an identifier for an entry of cache 252 to unpinned recency data structure 262 (e.g., if the entry is not pinned and has been accessed by application 104 more than once). As illustrated in FIG. 3A, in response to determining that entries 302C and/or 302D are not pinned and have been accessed by application 104 more than once, entry retrieval module 222 can add identifiers for entries 302C and/or 302D to data structure 262. In some embodiments, entry retrieval module 222 can add identifiers for entries 302C and/or 302D in a particular order that indicates which entry has been accessed more recently, as described above.

Figure 3B:
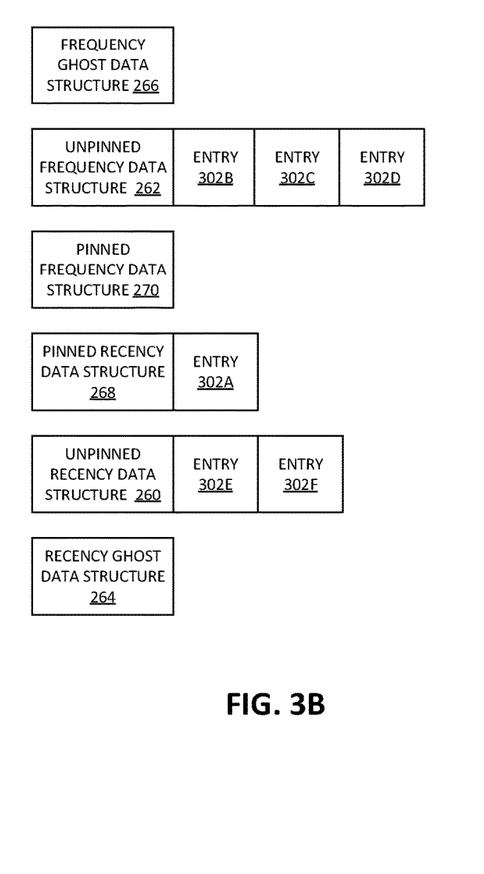

In some embodiments, entry retrieval module 222 can detect that an entry added to data structure 260 has been accessed by application 104 more than once. For example, entry retrieval module 222 can detect that entry 302B has been accessed by application 104 a second time since the identifier for entry 302B was added to data structure 260. In such embodiments, entry retrieval module 222 can move the identifier for entry 302B to data structure 262, in accordance with previously described embodiments. As illustrated in FIG. 3B, entry retrieval module 222 can move the identifier for entry 302B from data structure 260 to the top of data structure 262, to indicate that entry 302B is the most recently accessed entry of cache 252 and has been accessed more than once.

Referring back to FIG. 2, entry pinning module 224 can be configured to pin one or more entries to cache 252. For example, entry pinning module 224 can detect that a respective entry is to be pinned to cache 252, e.g., in response to receiving a request from application 104 to pin data units associated with the entry. As described above, application 104 can request to pin data units for a file 121 to cache 252 in response to a request from a user of client device 102, in response to determining that the file 121 (or portions of the file 121) satisfies a pinning criteria (e.g., is a frequently accessed file compared to other files maintained by platform 120, etc.), and so forth. Once an entry of cache 252 is pinned, the entry is not evicted from cache 252, even if the entry would otherwise qualify for eviction in view of a cache eviction protocol.

In some embodiments, the data units that are requested to be pinned to cache 252 can be stored in an entry of cache 252 when the request is received. In such embodiments, entry pinning module 224 may identify a data structure of data store 256 that includes an identifier for the entry to be pinned (e.g., data structure 260, data structure 262, etc.) and move the identifier to pinned recency data structure 268 or pinned frequency data structure 270. For example, entry pinning module 224 may move an identifier for the entry to be pinned from unpinned recency data structure 260 to pinned recency data structure 268. In another example, entry pinning module 224 may move an identifier for the entry to be pinned from unpinned frequency data structure 262 to pinned frequency data structure 270. In some embodiments, entry pinning module 224 can receive a request to pin an entry with a request to access the entry (e.g., after the entry has already been accessed once). In such embodiments, entry pinning module 224 can identify the identifier for the entry at unpinned recency data structure 260 and move the identifier to pinned frequency data structure 270. In other or similar embodiments, the data units can be stored in storage space 254 when the request to pin the data units is received. In such embodiments, entry pinning module 224 can add an identifier to data structure 268 and/or data structure 270 directly (i.e., without first adding the identifier to data structures 260 and/or 262. In an illustrative example, entry pinning module 224 can detect that entry 302A is to be pinned to cache 252. Accordingly, entry pinning module 224 can move the identifier for entry 302A from data structure 260 to data structure 268, as illustrated in FIG. 3B. Before or after entry 302A is pinned to cache 252, entry retrieval module 222 can add identifiers for entries 302E and/or 302F to data structure 260, in accordance with previously described embodiments.

In some embodiments, entry pinning module 224 can add the identifier for the entry to be pinned (now the pinned entry) to a slot or portion of data structure 268 and/or data structure 270 that corresponds to how recently application 104 has accessed the entry. For example, if entry pinning module 224 receives a request to pin the entry with a request to access the entry, entry pinning module 224 can add the entry identifier to the top of data structure 268 and/or 270, as the pinned entry is the most recently accessed entry associated with data structure 268 and/or 270. In another example, the entry pinned to cache 252 may not be the most recently accessed entry of cache 252. In such example, entry pinning module 224 can add the entry identifier to a slot of data structure 268 and/or 270 that corresponds to the time at which the entry was last accessed by application 104. For instance, if the pinned entry is the least recently accessed entry of data structure 268, entry pinning module 224 can add the entry identifier to the bottom of data structure 268. In other or similar embodiments, entry pinning module 224 can add state data associated with a respective entry to data structure 268 and/or 270. For example, entry pinning module 224 can obtain a time at which a pinned entry was last accessed (e.g., based on the identifier position in data structures 260 and/or 262, from another component of client device 102, etc.) and store an indication of the obtained time with the identifier for the entry at data structure 268 and/or 270.

Figure 3C:
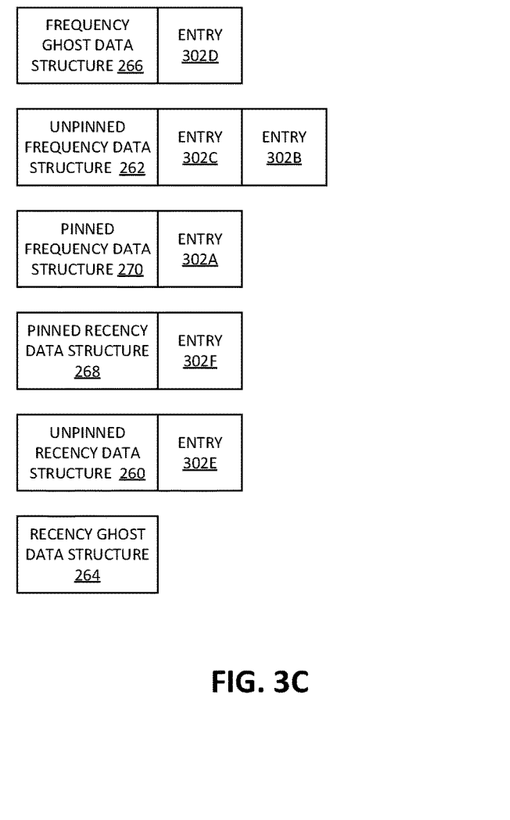

In some embodiments, entry pinning module 224 can move an identifier for a pinned entry from pinned recency data structure 268 to pinned frequency data structure 270. For example, in response to detecting that pinned entry 302A is accessed by application 104 more than once, entry pinning module 224 can move the identifier for entry 302A from data structure 268 to data structure 270, as illustrated in FIG. 3C. Entry pinning module 224 can add the identifier for entry 302A to a slot or portion of data structure 270, in accordance with previously described embodiments.

Figure 3D:
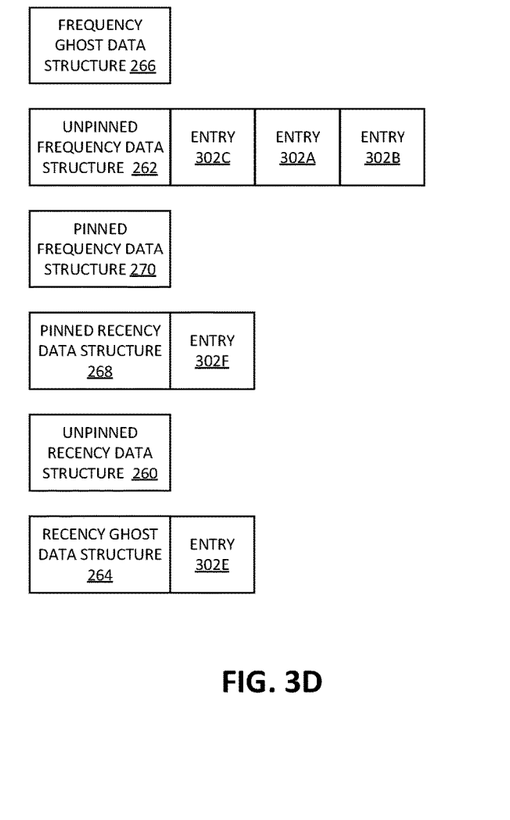

Entry pinning module 224 can detect that a pinned entry is to be unpinned, in some embodiments. For example, entry pinning module 224 can receive a request (e.g., from application 104) to unpin an entry of cache 242. Application 104 can request to unpin an entry from cache 242 in response to a request from a user of client device 102, in response to detecting that data units of the entry satisfy an unpinning criterion (e.g., the file 121 has not been accessed and/or requested by the user for a threshold amount of time, etc.). In response to detecting that an entry is to be unpinned from cache 242, entry pinning module 224 can move an identifier for the entry from data structure 268 and/or 270 to another data structure of data store 256. In some embodiments, entry pinning module 224 can move an identifier for an entry to be unpinned from data structure 268 to data structure 260. In other or similar embodiments, entry pinning module 224 can move an identifier for an entry to be unpinned from data structure 270 to data structure 262. For example, entry pinning module 224 can receive a request to unpin entry 302A from cache 252. Accordingly, entry pinning module 224 can move an identifier for entry 302A from data structure 270 to data structure 262, as illustrated in FIGS. 3C and 3D.

In some embodiments, entry pinning module 224 can add the identifier for the entry to be unpinned to a slot or portion of data structure 260 and/or 262 that corresponds to an order at which entries associated with the respective data structure were last accessed by application 104. For example, entry pinning module 224 can determine a time that entry 302A was last accessed by application 104 (e.g., based on the position of the identifier for entry 302A in data structure 270, based on state data associated with entry 302A, etc.). Entry pinning module 224 can determine (e.g., based on a position of identifiers for entries 302C and/or 302B in data structure 262, based on state data associated with entries 302C and/or 302B, etc.) that entry 302C was accessed more recently than entry 302A and entry 302A was accessed more recently than entry 302B. Accordingly, entry pinning module 224 can add the identifier for entry 302A between identifiers for entries 302C and 302B in data structure 262. In one example, the time that entry 302A was last accessed can be later than the access time for each entry of data structure 262 and/or 260. In such embodiments, entry pinning module 224 can add the identifier for entry 302A to the end of data structure 262 and/or 260.

Referring back to FIG. 2, entry eviction module 226 can be configured to evict (i.e., remove) entries from cache 252 in accordance with a cache eviction protocol, as described above. For example, in some embodiments, entry eviction module 226 can identify entries of cache 252 that are least recently accessed and/or least frequently accessed (i.e., indicated by data structures 260 and/or 262) and select the least recently and/or least frequently accessed entries to be evicted from cache 252. Entry eviction module 226 will not identify pinned entries of cache 252 (i.e., indicated by data structures 268 and/or 270) as candidates for eviction, even if data units of the entry would otherwise qualify for eviction in view of the cache eviction protocol. In response to removing the data units from cache 252, entry eviction module 226 can update a mapping associated with the data units in L2P data structure 258 to indicate the address of storage space 254 that stores the data units.

In some embodiments, caching engine 151 can maintain one or more ghost entry data structures (e.g., recency ghost data structure 264, frequency ghost data structure 266, etc.). A ghost entry data structure can be configured to store identifiers for entries that have been evicted from another data structure of data store 256 (e.g., data structure 260, 262, 268, 270, etc.). For example, an identifier for an entry can be added to data structure 260, as described above. In response to determining to evict the entry, entry eviction module 226 can remove data units associated with the entry from cache 252, as described above, and can add the entry identifier to ghost data structure 264. In some embodiments, entry eviction module 226 can add the entry identifier to a slot or portion of ghost data structure 264 corresponding to an ordering that entries are added to the data structure 264 (e.g., if the entry is the most recent entry to be added to data structure 264, entry eviction module 226 can add the entry identifier to the top of the data structure 264). In other or similar embodiments, entry eviction module 226 can add the entry identifier to a slot or portion of ghost data structure 264 corresponding to an ordering that entries of data structure 264 are last accessed (e.g., if the entry is the most recently accessed entry of the entries added to data structure 264, entry eviction module 226 can add the entry identifier to the top of data structure 264). If an entry added to data structure 264 and/or 266 is accessed by application 104, entry retrieval module 222 can copy the data units associated with the entry to an available space of cache 252 and can move the entry identifier from data structure 264 and/or 266 to data structures 260, 262, 268, and/or 270, in accordance with previously described embodiments. In such embodiments, entry retrieval module 222 can update the mapping of L2P data structure 258 to correspond to the entry, as described above. Entry identifiers can be removed from data structure 264 and/or 266 in accordance with a removal protocol (e.g., if the entry is the oldest entry indicated by data structure 264 and/or 266 and one or more new entries are to be added to data structure 264 and/or 266, if a time since the entry was last accessed satisfies a time criterion, etc.).

FIGS. 3C-3D illustrate an example of evicting cache entries, according to a cache eviction protocol, in accordance with embodiments described herein. As illustrated with respect to FIG. 3C, entries 302A and 302F are pinned to cache 252. Accordingly, cache eviction module 226 does not select entry 302A and/or 302F for eviction, even if entries 302A and/or 302F would otherwise qualify for eviction in view of the eviction protocol. In one example, cache eviction module 226 can select entry 302D for eviction from cache 252 in accordance with the cache eviction protocol (e.g., if entry 302D is the least recently accessed entry indicated by data structure 262). In such example, cache eviction module 226 can remove data units of entry 302D from cache 252, as described above. Cache eviction module 226 can move an identifier for entry 302D from data structure 262 to data structure 266. If data units for entry 302D are accessed again before entry 302D is removed from data structure 266, cache retrieval engine 222 can retrieve the data units from storage 254 and copy the data units to entry 302D of cache 252, as described above. Cache retrieval engine 222 can move the identifier for entry 302D to data structure 262 and/or data structure 260, in accordance with previously described embodiments. If entry 302D is not accessed by application 104, the identifier for entry 302D can be removed from data structure 266, in accordance with previously described embodiments. In another example, cache eviction module 226 can select entry 302E for eviction from cache 252 (e.g., if entry 302E is the least recently accessed entry indicated by data structure 260). Cache eviction module 226 can remove data units for entry 302E from cache 252 and move an identifier for entry 302E to data structure 364, in accordance with previously described embodiments.

In accordance with previously provided examples, entry 302A can be unpinned from cache 252. Cache pinning module 224 can move an identifier for entry 302A to data structure 262 and/or 260, as described above. Once entry 302A is unpinned from cache 252, entry 302A can be eligible for eviction in view of the cache eviction protocol, in accordance with embodiments described above.

Figure 4:
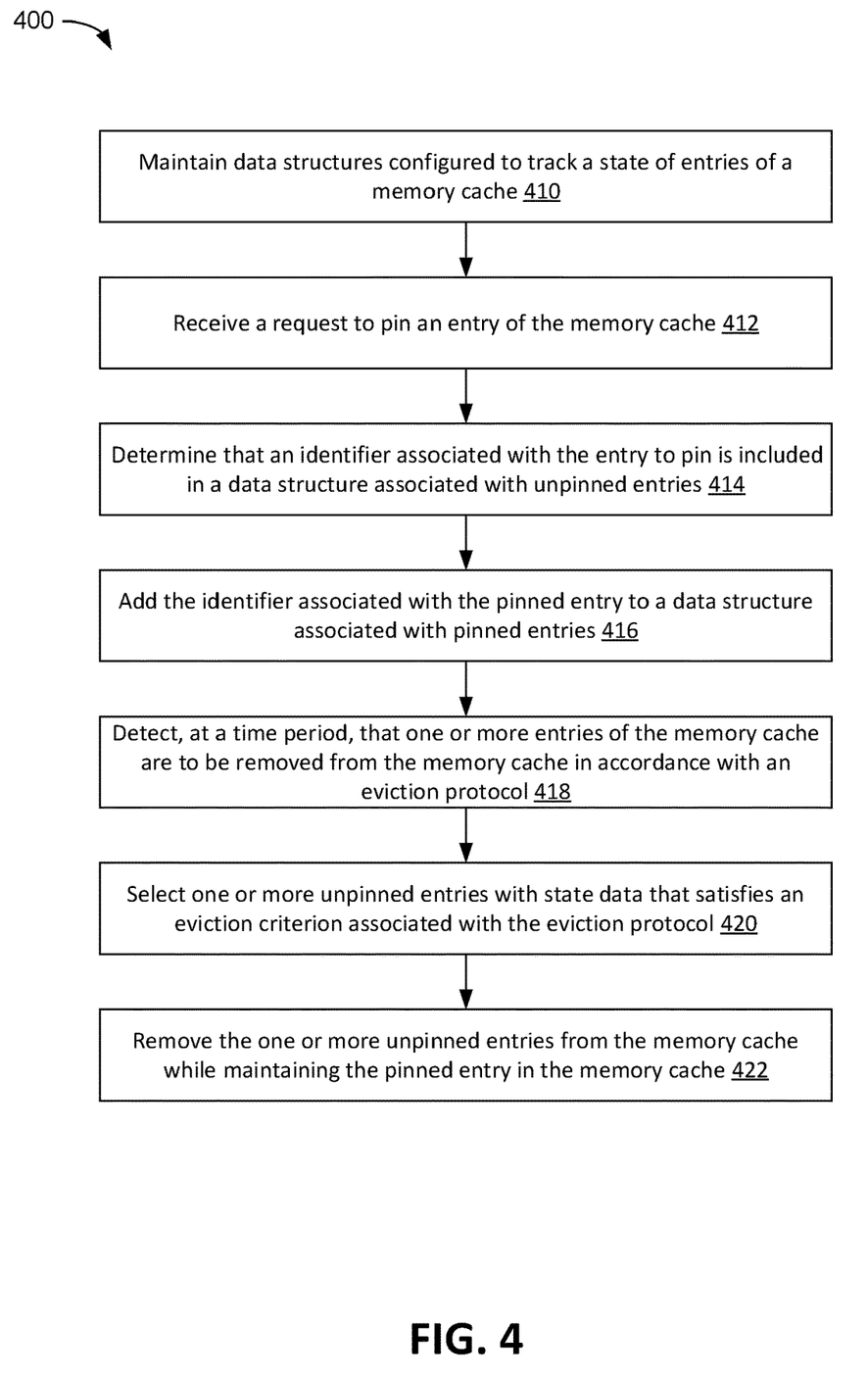
FIG. 4 depicts a flow diagram of a method for implementing a memory cache replacement scheme with pinned cache entries, in accordance with implementations of the present disclosure.

FIG. 4 depicts a flow diagram of a method 400 for implementing a memory cache replacement scheme with pinned cache entries, in accordance with implementations of the present disclosure. In some embodiments, method 400 can be performed by caching engine 151 of platform 120 (i.e., described with respect to FIGS. 1 and 2). In other or similar embodiments, method 400 can be performed by caching engine 151 of a client-based application (e.g., document application 104) that runs on client device 102. The client-based application may be executed by a processing device of client device 102.

For simplicity of explanation, method 400 of this disclosure is depicted and described as a series of acts. However, acts in accordance with this disclosure can occur in various orders and/or concurrently, and with other acts not presented and described herein. Furthermore, not all illustrated acts may be required to implement method 400 in accordance with the disclosed subject matter. In addition, those skilled in the art will understand and appreciate that method 400 could alternatively be represented as a series of interrelated states via a state diagram or events. Additionally, it should be appreciated that method 400 disclosed in this specification is capable of being stored on an article of manufacture to facilitate transporting and transferring such method to computing devices. The term "article of manufacture," as used herein, is intended to encompass a computer program accessible from any computer-readable device or storage media.

At operation 410, processing logic (e.g., caching engine 151, etc.) maintains data structures configured to track a state of entries of a memory cache. In some embodiments, a first data structure can include identifiers for pinned entries of a memory cache (e.g., data structure 268 and/or 270 described with respect to FIGS. 2-3D), a second data structure can include identifiers for unpinned entries of the cache that have been accessed once (e.g., data structure 260), and a third data structure can include identifiers for unpinned entries of the cache that have been accessed more than once (e.g., data structure 262).

At operation 412, processing logic receives a request to pin an entry of the memory cache. In some embodiments, processing logic can receive the request from an application running on a client device (e.g., application 104 of client device 102), as described above. At operation 414, processing logic determines that an identifier associated with the entry to pin is included in a data structure associated with unpinned entries. For example, processing logic can determine that an identifier associated with the entry to pin is included in unpinned recency data structure 260 and/or unpinned frequency data structure 262. At operation 416, processing logic adds the identifier associated with the pinned entry to a data structure associated with pinned entries. In some embodiments, processing logic can move the identifier for the entry to be pinned from data structure 260 to data structure 268, as described above. In other or similar embodiments, processing logic can move the identifier for the entry to be pinned from data structure 262 to data structure 270, as described above.

At operation 418, processing logic detects, at a time period, that one or more entries of the memory cache are to be removed from the memory cache in accordance with an eviction protocol. For example, processing logic can determine that one or more entries are to be removed from the cache to make room for additional entries of the cache. At operation 420, processing logic selects one or more unpinned entries (i.e., from unpinned recency data structure 260 and/or unpinned frequency data structure 262) with state data that satisfies an eviction criterion associated with the eviction protocol. For example, processing logic can select one or more unpinned entries from data structure 260 and/or 262 that are the least recently accessed entries, the least frequently accessed entries, etc. In some embodiments, the state data of the pinned entry can correspond to the state data of the one or more unpinned entries (e.g., the pinned entry may have been accessed at the same frequency and/or at the same time as the unpinned entries, the pinned entry may have been accessed less frequently and/or recently than the unpinned entries, etc.). However, the pinned entry is not considered for eviction, even though the state data for the pinned entry satisfies the eviction criterion associated with the eviction protocol.

At operation 422, processing logic removes the selected one or more unpinned entries from the memory cache while maintaining the pinned entry in the memory cache. In some embodiments, processing logic can move identifiers for the evicted entries to ghost entry data structures, such as data structures 266 and/or 264. Processing logic can unpin a pinned entry (e.g., in response to a request from application 104. In such embodiments, the unpinned entry can be eligible for eviction in view of the cache eviction protocol, in accordance with embodiments provided herein.

Figure 5:
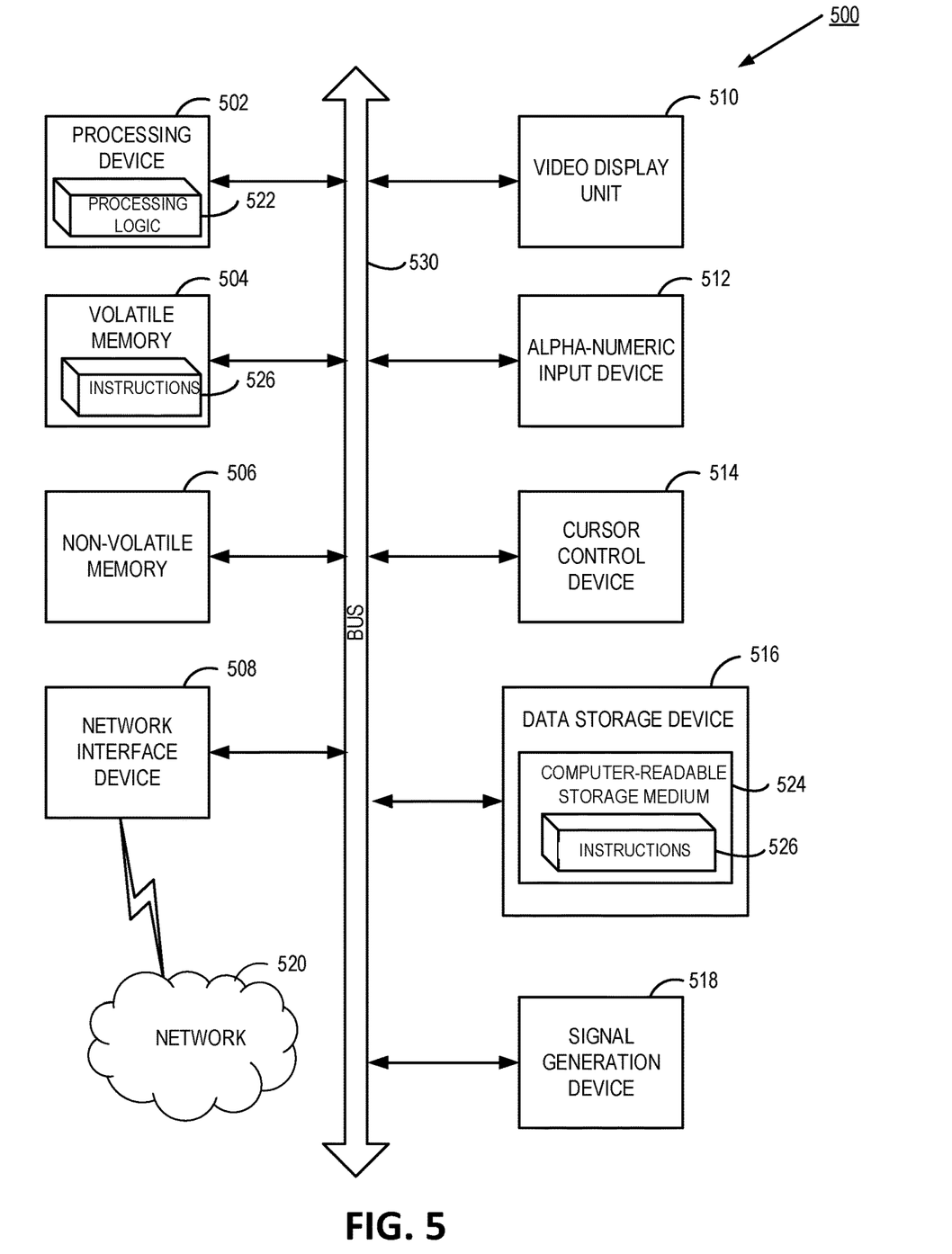
FIG. 5 is a block diagram illustrating an exemplary computer system, in accordance with implementations of the present disclosure.

FIG. 5 is a block diagram illustrating an exemplary computer system, in accordance with implementations of the present disclosure. The computer system 500 can be the platform 120, server machine 130 or client device 102 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 640.

Processor (processing device) 502 represents one or more general-purpose processing devices such as a microprocessor, central processing unit, or the like. More particularly, the processor 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 can also be one or more special-purpose processing devices such as an application specific integrated circuit (ASIC), a field programmable gate array (FPGA), a digital signal processor (DSP), network processor, or the like. The processor 502 is configured to execute instructions 505 (e.g., for predicting channel lineup viewership) for performing the operations discussed herein.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 520 (e.g., a speaker).

The data storage device 518 can include a non-transitory machine-readable storage medium 524 (also computer-readable storage medium) on which is stored one or more sets of instructions 505 (e.g., for managing entries of a memory cache, etc.) embodying any one or more of the methodologies or functions described herein. The instructions can also reside, completely or at least partially, within the main memory 504 and/or within the processor 502 during execution thereof by the computer system 500, the main memory 504 and the processor 502 also constituting machine-readable storage media. The instructions can further be transmitted or received over a network 530 via the network interface device 508.

In one implementation, the instructions 505 include instructions for designating a verbal statement as a polling question. While the computer-readable storage medium 524 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment" means that a particular feature, structure, or characteristic described in connection with the implementation and/or embodiment is included in at least one implementation. Thus, the appearances of the phrase "in one implementation," "in one embodiment," "in an implementation," or "in one embodiment" in various places throughout this specification can, but are not necessarily, referring to the same implementation and/or embodiment, depending on the circumstances. Furthermore, the particular features, structures, or characteristics may be combined in any suitable manner in one or more implementations and/or embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
    maintaining a plurality of data structures configured to track a state of entries of a memory cache, wherein a first data structure of the plurality of data structures comprises identifiers for pinned entries of a memory cache, a second data structure of the plurality of data structures comprises identifiers for unpinned entries of the memory cache that have been accessed once, and a third data structure of the plurality of data structures comprises identifiers for unpinned entries of the memory cache that have been accessed more than once;
    receiving a request to pin an entry;
    determining that an identifier associated with the entry to pin is included in the second data structure or the third data structure;
    adding the identifier associated with the pinned entry to the first data structure;
    detecting, at a time period, that one or more entries of the memory cache are to be removed from the memory cache in accordance with an eviction protocol;
    selecting, from at least one of the second data structure or the third data structure, one or more identifiers of one or more unpinned entries with state data that satisfies an eviction criterion associated with the eviction protocol, wherein the state data of the one or more unpinned entries corresponds to state data of the pinned entry; and
    removing the one or more unpinned entries from the memory cache while maintaining the pinned entry in the memory cache.

2. The method of claim 1, wherein the first data structure is configured to store identifiers for pinned entries that have been accessed once, and wherein the identifier associated with the pinned entry is added to the first data structure responsive to determining that the identifier associated with the entry is included in the second data structure.

3. The method of claim 2, wherein the plurality of data structures further comprises a fourth data structure comprising identifiers for pinned entries of the memory cache that have been accessed more than once, and wherein the method further comprises:
    responsive to determining that the pinned entry added to the first data structure has been accessed more than once, moving the identifier associated with the pinned entry from the first data structure to the fourth data structure.

4. The method of claim 1, wherein the first data structure is configured to store identifiers for pinned entries that have been accessed more than once, and wherein the identifier associated with the pinned entry is added to the first data structure responsive to determining that the identifier associated with the entry is included in the third data structure.

5. The method of claim 1, further comprising:
    receiving a request to unpin the entry;
    identifying a slot in the second data structure or the third data structure to add the identifier associated with the entry; and
    moving the identifier associated with the entry from the first data structure to the identified slot of the second data structure or the third data structure.

6. The method of claim 5, further comprising:
    determining that the state data of the entry satisfies the eviction criterion; and
    removing the entry from the memory cache.

7. The method of claim 1, wherein the state data of the one or more unpinned entries and the state data of the pinned entry correspond to an amount of time that has passed since the corresponding entry has been referenced.

8. The method of claim 7, wherein the state data satisfies the eviction criterion in response to the amount of time that has passed since the corresponding entry has been accessed exceeding a threshold amount of time.

9. The method of claim 1, wherein the eviction protocol corresponds to at least one of a least recently accessed eviction protocol or a least frequently accessed eviction protocol.

10. A system comprising:
    a memory device; and
    a processing device coupled to the memory device, the processing device to perform operations comprising:
        maintaining a plurality of data structures configured to track a state of entries of a memory cache, wherein a first data structure of the plurality of data structures comprises identifiers for pinned entries of a memory cache, a second data structure of the plurality of data structures comprises identifiers for unpinned entries of the memory cache that have been accessed once, and a third data structure of the plurality of data structures comprises identifiers for unpinned entries of the memory cache that have been accessed more than once;

receiving a request to pin an entry;

determining that an identifier associated with the entry to pin is included in the second data structure or the third data structure;

adding the identifier associated with the pinned entry to the first data structure;

detecting, at a time period, that one or more entries of the memory cache are to be removed from the memory cache in accordance with an eviction protocol;

selecting, of at least one of the second data structure or the third data structure, one or more identifiers of one or more unpinned entries with state data that satisfies an eviction criterion associated with the eviction protocol, wherein the state data of the one or more unpinned entries corresponds to state data of the pinned entry; and removing the one or more unpinned entries from the memory cache while maintaining the pinned entry in the memory cache.

11. The system of claim 10, wherein the first data structure is configured to store identifiers for pinned entries that have been accessed once, and wherein the identifier associated with the pinned entry is added to the first data structure responsive to determining that the identifier associated with the entry is included in the second data structure.

12. The system of claim 11, wherein the plurality of data structures further comprises a fourth data structure comprising identifiers for pinned entries of the memory cache that have been accessed more than once, and wherein the operations further comprise:

responsive to determining that the pinned entry added to the first data structure has been accessed more than once, moving the identifier associated with the pinned entry from the first data structure to the fourth data structure.

13. The system of claim 10, wherein the first data structure is configured to store identifiers for pinned entries that have been accessed more than once, and wherein the identifier associated with the pinned entry is added to the first data structure responsive to determining that the identifier associated with the entry is included in the third data structure.

14. The system of claim 10, wherein the operations further comprise:

receiving a request to unpin the entry;

identifying a slot in the second data structure or the third data structure to add the identifier associated with the entry; and moving the identifier associated with the entry from the first data structure to the identified slot of the second data structure or the third data structure.

15. The system of claim 14, wherein the operations further comprise:

determining that the state data of the entry satisfies the eviction criterion; and removing the entry from the memory cache.

16. A non-transitory computer readable storage medium comprising instructions for a server that, when executed by a processing device, cause the processing device to perform operations comprising:

maintaining a plurality of data structures configured to track a state of entries of a memory cache, wherein a first data structure of the plurality of data structures comprises identifiers for pinned entries of a memory cache, a second data structure of the plurality of data structures comprises identifiers for unpinned entries of the memory cache that have been accessed once, and a third data structure of the plurality of data structures comprises identifiers for unpinned entries of the memory cache that have been accessed more than once;

receiving a request to pin an entry;

determining that an identifier associated with the entry to pin is included in the second data structure or the third data structure;

adding the identifier associated with the pinned entry to the first data structure;

detecting, at a time period, that one or more entries of the memory cache are to be removed from the memory cache in accordance with an eviction protocol;

selecting, of at least one of the second data structure or the third data structure, one or more identifiers of one or more unpinned entries with state data that satisfies an eviction criterion associated with the eviction protocol, wherein the state data of the one or more unpinned entries corresponds to state data of the pinned entry; and removing the one or more unpinned entries from the memory cache while maintaining the pinned entry in the memory cache.

17. The non-transitory computer readable storage medium of claim 16, wherein the first data structure is configured to store identifiers for pinned entries that have been accessed once, and wherein the identifier associated with the pinned entry is added to the first data structure responsive to determining that the identifier associated with the entry is included in the second data structure.

18. The non-transitory computer readable storage medium of claim 17, wherein the plurality of data structures further comprises a fourth data structure comprising identifiers for pinned entries of the memory cache that have been accessed more than once, and wherein the operations further comprise:

responsive to determining that the pinned entry added to the first data structure has been accessed more than once, moving the identifier associated with the pinned entry from the first data structure to the fourth data structure.

19. The non-transitory computer readable storage medium of claim 16, wherein the first data structure is configured to store identifiers for pinned entries that have been accessed more than once, and wherein the identifier associated with the pinned entry is added to the first data structure responsive to determining that the identifier associated with the entry is included in the third data structure.

20. The non-transitory computer readable storage medium of claim 16, wherein the operations further comprise:

receiving a request to unpin the entry;

identifying a slot of the second data structure or the third data structure to add the identifier associated with the entry; and moving the identifier associated with the entry from the first data structure to the identified slot of the second data structure or the third data structure.

* * * * *